United States Patent
Bangalore et al.

(10) Patent No.: US 6,947,885 B2
(45) Date of Patent: Sep. 20, 2005

(54) PROBABILISTIC MODEL FOR NATURAL LANGUAGE GENERATION

(75) Inventors: Srinivas Bangalore, Hackettstown, NJ (US); Owen Christopher Rambow, Hoboken, NJ (US)

(73) Assignee: AT&T Corp., New York, NY (US)

(*) Notice: Subject to any disclaimer, the term of this patent is extended or adjusted under 35 U.S.C. 154(b) by 828 days.

(21) Appl. No.: 09/758,483

(22) Filed: Jan. 11, 2001

(65) Prior Publication Data

US 2002/0026306 A1 Feb. 28, 2002

Related U.S. Application Data

(60) Provisional application No. 60/176,511, filed on Jan. 18, 2000.

(51) Int. Cl.[7] .............................................. G06F 17/20
(52) U.S. Cl. ................................ 704/1; 704/4; 704/9
(58) Field of Search .......................... 704/1, 4, 9, 200, 704/252, 257; 715/533

(56) References Cited

U.S. PATENT DOCUMENTS

| | | | |
|---|---|---|---|
| 5,237,502 A | | 8/1993 | White et al. |
| 5,241,619 A | * | 8/1993 | Schwartz et al. ........... 704/200 |
| 5,526,479 A | | 6/1996 | Barstow et al. |
| 5,721,939 A | | 2/1998 | Kaplan |
| 5,754,736 A | * | 5/1998 | Aust .......................... 704/252 |
| 5,761,637 A | | 6/1998 | Chino |
| 5,774,525 A | | 6/1998 | Kanevsky |
| 5,930,746 A | * | 7/1999 | Ting .............................. 704/9 |
| 5,963,894 A | | 10/1999 | Richardson |
| 5,987,404 A | | 11/1999 | Della Pietra et al. |
| 6,044,347 A | | 3/2000 | Abella et al. |
| 6,128,634 A | | 10/2000 | Golovchinsky et al. |
| 6,163,769 A | | 12/2000 | Acero et al. |
| 6,169,972 B1 | * | 1/2001 | Kono et al. ................. 704/257 |
| 6,789,231 B1 | * | 9/2004 | Reynar et al. .............. 715/533 |

* cited by examiner

Primary Examiner—Susan McFadden
Assistant Examiner—Huyen X. Vo

(57) ABSTRACT

A natural language generator utilizes a stochastic process to choose a derivation tree according to a predetermined reference grammar, such as a tree-adjoined grammar (TAG). A word lattice is created from a single semi-specified derivation tree and the proper path (i.e., desired output string) is selected from the lattice using a least cost, or other appropriate algorithm.

4 Claims, 3 Drawing Sheets

PROBABILISTIC MODEL FOR NATURAL LANGUAGE GENERATION

CROSS REFERENCE TO RELATED APPLICATION

This application claims the priority of Provisional Application No. 60/176,511, filed Jan. 18, 2000.

TECHNICAL FIELD

The present invention relates to the concept of natural language generation and, more particularly, to the utilization of a tree-based representation of syntax for utilization in natural language generation.

BACKGROUND OF THE INVENTION

For many applications of natural language generation (NLG), the range of linguistic expressions that must be generated is quite restricted and a grammar for NLG in these instances can be fully specified by hand. Moreover, in many cases it is important not to deviate from certain linguistic standards in generation, in which case hand-crafted grammars provide excellent control. However, in other applications for NLG (which are ever-increasing as the technology evolves), the variety of output is much larger, while the demands on the quality of the output typically becomes less stringent. A typical example is NLG in the context of interlingua- or transfer-based machine translation. Additionally, the output quality from NLG may be relaxed if there is insufficient time available to develop a full grammar for a new target language in NLG.

The basic tasks of natural language generation include: text planning (i.e., the content and structure of the target text are determined to achieve the overall communicative goal), sentence planning (i.e., linguistic means (particularly lexical and syntactic means) are determined to convey smaller pieces of meaning), and realization (i.e., the configuration chosen in sentence planning is transformed into a surface string, by linearizing and inflecting words in the sentence). During the realization process, "function words" may be added to the sentence as well.

In each case, stochastic (e.g., "empiricist") methods provide an alternative to hand-crafted ("rationalist") approaches to NLG. A description of the stochastic technique can be found in an article entitled "Generation that exploits corpus-based statistical knowledge" by I. Langkilde et al., appearing in the Proceedings of the 36th Meeting of the Association for Computational Linguistics and 17th International Conference on Computational Linguistics, 1998, Montreal, Canada, at pp.704–710., Stochastic approaches to natural language generation do not include a tree-based representation of syntax. While this may be adequate (or even advantageous) for some applications, other applications profit from using as much syntactic knowledge as is available, leaving to a stochastic model only those issues that are not determined by the grammar.

A need remains in the art, therefore, for improvements upon the stochastic-based natural language generation methods.

SUMMARY OF THE INVENTION

The need remaining in the prior art is addressed by the present invention, which relates to the concept of natural language generation and, more particularly, to the utilization of a tree-based representation of syntax for utilization in natural language generation.

In accordance with the present invention, natural language generation is proposed that utilizes an n-gram language model augmented with a tree-based stochastic model and a tree-based syntactic grammar. The system of the present invention comprises three separate modules: (1) tree chooser, (2) unraveler, and (3) linear precedence (LP) chooser. The tree chooser uses a stochastic tree model to determine the syntactic realization for the nodes in the input syntactic dependency tree. The unraveler module then uses a reference grammar to produce a lattice of all possible linearizations that are compatible with the output of the tree chooser. The LP chooser then selects the most likely traversal of the lattice for a given language model and provides the selected linearization as the output of the generator.

BRIEF DESCRIPTION OF THE DRAWINGS

Referring now to the drawings.

DETAILED DESCRIPTION

In order to model syntax in accordance with the present invention, a "reference grammar" is used that relates high-level syntactic realization choices to the linear order of words. It is possible, for example, to use an existing wide-coverage grammar of the target language (in this example, English), where the well-known XTAG grammar (developed at the University of Pennsylvania) is one such choice. XTAG is a tree-adjoining grammar (TAG) in which the elementary structures are phrase-structure trees that are composed using two operations—substitution (which appends one tree at the frontier of another), and adjunction (which inserts one tree into the middle of another). In graphical representation, nodes at which substitutions can take place are marked with "down" arrows-↓. In linguistic uses of TAG, one lexical item (defined as its "anchor") is associated with each tree, and one or more trees are associated with each lexical item (usually, multiple trees). As a result, a lexicalized TAG, referred to as an LTAG, is obtained. Since each lexical item is associated with an entire tree (as opposed to a phrase-structure rule, for example), the predicate-argument structure of the lexeme can be specified (by including nodes at which its arguments must be substituted), as well as the morpho-syntactic constraints (such as subject-verb agreement) within the structure associated with the lexeme. This property is referred to as the TAG's "extended domain of locality". It is to be noted that in LTAG, there is no distinction between lexicon and grammar.

Figure 1:
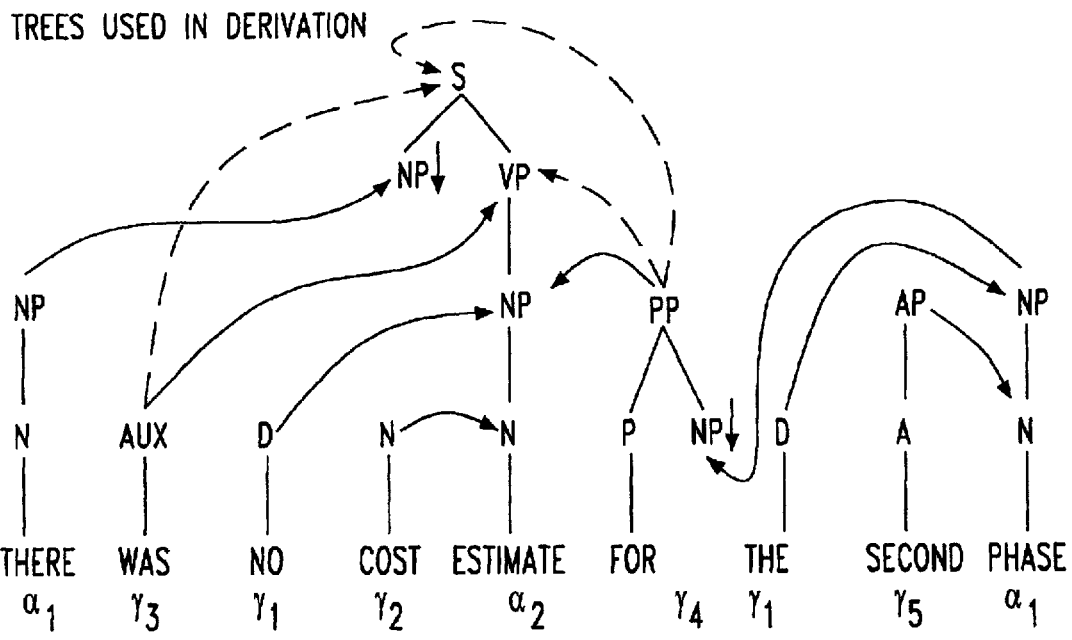
FIG. 1 illustrates an excerpt from the XTAG grammar for a particular derivation.

FIG. 1 illustrates an exemplary grammar used to derive "There was no cost estimate for the second phase". In accordance with the present invention, adjuncts such as adverbs are defined by tree structures that simply express their active valency, but not how they connect to the lexical item they modify. The connection information is maintained in a separate adjunction table for grammar fragments, such as that illustrated below in Table I:

TABLE I

| s-tag | anchored by | adjoins to | direction |
|---|---|---|---|
| γ1 | Det | NP | right |
| γ2 | N | N | right |
| γ3 | Aux | S, VP | right |
| γ4 | Prep/or | NP, VP/S | left/right |
| γ5 | Adj | N | right |

Trees that can adjoin to other trees (and have entries in the adjunction table) are called gamma-trees, all other trees (which can only be substituted into other trees) are denoted as alpha-trees. It is to be noted that a tree can be referred to by a combination of its name (defined as its "supertag") and its anchor. For example, $\alpha_1$ is the supertag of an alpha-tree anchored by a noun that projects up to NP, while $\gamma_2$ is the supertag of a gamma tree anchored by a noun that only projects to N (assuming adjectives are adjoined at N) and, as the adjunction table shows, can right-adjoin to an N. Another tree that a supertag can be associated with is $\alpha_2$, which represents the predicative use of a noun. It is to be noted that not all nouns are associated with all nominal supertags. For example, the expletive there has only a single $\alpha_1$.

Figure 2:
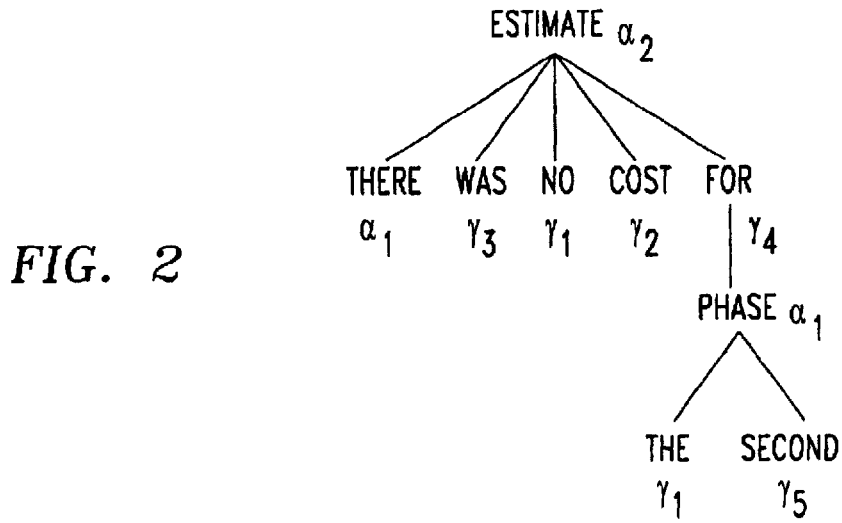
FIG. 2 is a derivation tree for LTAG derivation of the phrase illustrated in FIG. 1, where the derivation tree (without the supertags) is used as the input to generation system of the present invention.

When deriving a sentence using an LTAG, elementary trees from the grammar are combined using adjunction and substitution. For example, to derive the sentence There was no cost estimate for the second phase from the grammar in FIG. 1, the tree for "there" can be substituted into the tree for "estimate". To this combination is adjoined the trees for the auxiliary "was", the determiner "no", and the modifying noun "cost". Note that these adjunctions occur at different nodes; at VP, NP, and N, respectively. The preposition "for" is then adjoined, into which "phase" can be substituted, adjoined by "the" and "second". FIG. 2 illustrates this particular derivation tree, where it is to be noted that all adjunctions are by gamma trees and all substitutions are by alpha trees. In particular and with reference to FIG. 2, whenever it is required to adjoin or substitute a first tree $t_1$ into a second tree $t_2$, a new "daughter" labeled $t_1$ is added to the node labeled $t_2$. As discussed above, the name of each tree used is the lexeme along with the supertag. As can be seen by reference to FIG. 2, this structure is a dependency tree and resembles a representation of lexical argument structure.

Figure 3:
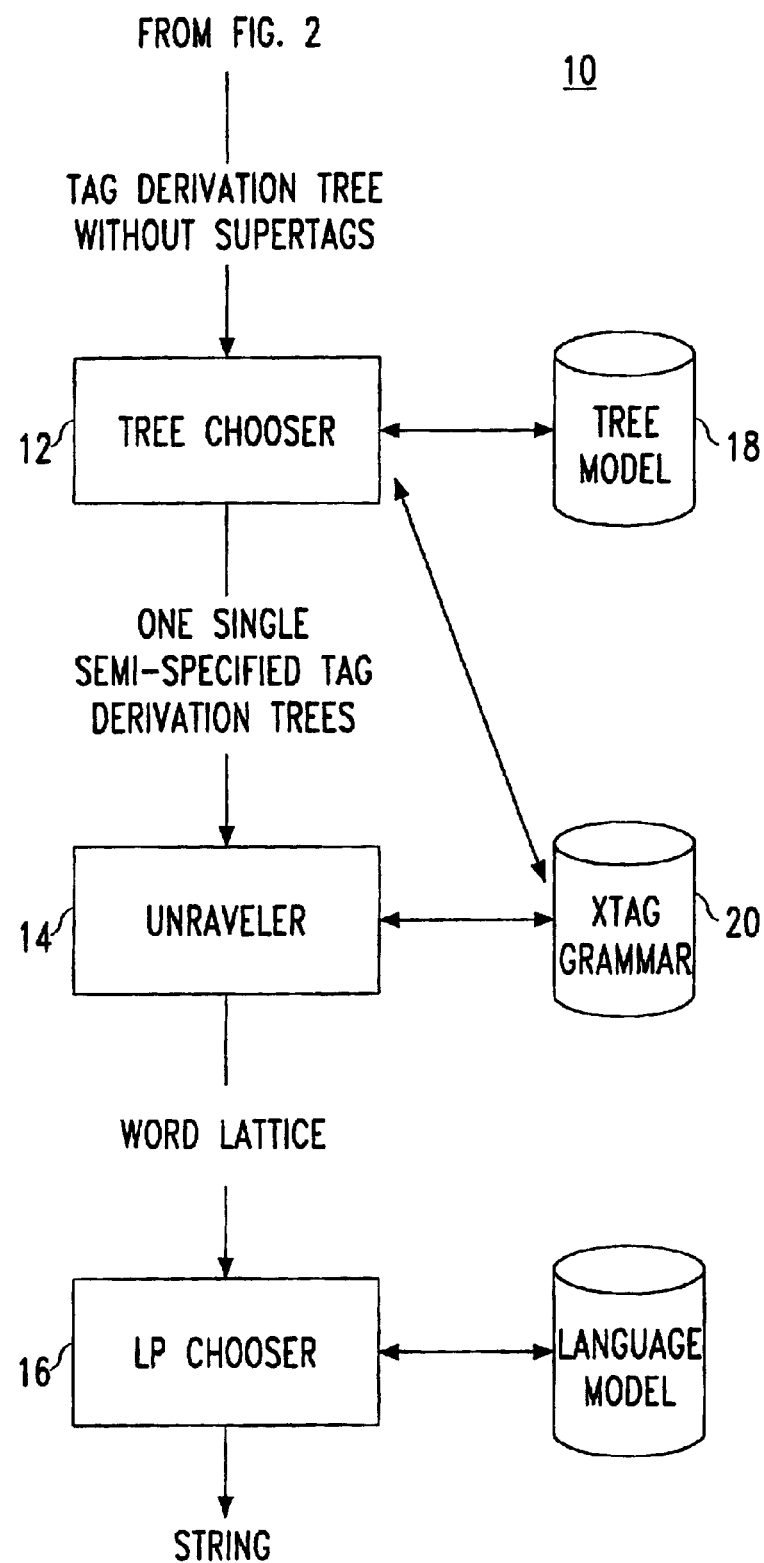
FIG. 3 contains a flow chart illustrating the architecture of the natural language generation system of the present invention.

As mentioned above, the natural language generation system of the present invention comprises three separate modules, as illustrated in system diagram 10 of FIG. 3. As shown, NLG system 10 comprises a tree chooser module 12, an unraveler module 14 and a linear precedence chooser 16. The input to system 10 is a dependency tree, similar to that as shown in FIG. 2, but without the supertag definitions. Tree chooser module 12 then utilizes a stochastic tree module to choose syntactic realizations for words. Therefore, if a TAG grammar is used as the reference grammar, then TAG trees are chosen for the nodes in the input structure. This step in the process can be related to "supertagging" as performed in the prior art, except that in this case supertags (i.e., names of syntactic realizations, or in the case of a TAG reference grammar, names of trees) must be found for words in a tree rather than for words in a linear sequence. Tree chooser module 12 utilizes a tree model database 18 which may comprise a representation of XTAG derivations of, for example, 1,000,000 words of the Wall Street Journal. Tree chooser module 12 may utilize simplifying assumptions such as that the choice of a tree for a node depends only on its daughter nodes, thus allowing for a top-down dynamic programming algorithm. In particular, a node η in the input structure is assigned a supertag s so that the probability of finding the treelet composed of η with supertag s is compatible with η's mother and her supertag $s_m$. For the purposes of the present invention, "compatible" means that the syntactic realization represented by s can be combined with the syntactic realization represented by $s_m$, according to the reference grammar. When using XTAG as the reference grammar, this results in the trees represented by s being able to be adjoined or substituted into the tree represented by $s_{m1}$ according to the XTAG grammar. For the example illustrated in FIG. 2, the input to tree chooser module 12 is the tree without the supertags, and the output from module 12 is the tree as shown in FIG. 2, including the illustrated supertags. It is to be noted that while a derivation tree in TAG fully specifies a derivation and thus a surface sentence, the output from tree chooser module 12 does not provide such a full specification, for at least two reasons. First, as explained above, trees corresponding to adjuncts are under-specified with respect to the adjunction site and/or the adjunction direction (from the left or from the right) in the tree of the mother node or they may be unordered with respect to other adjuncts (such as, for example, the adjective ordering problem). Secondly, supertags may have been chosen incorrectly or not at all.

Figure 4:
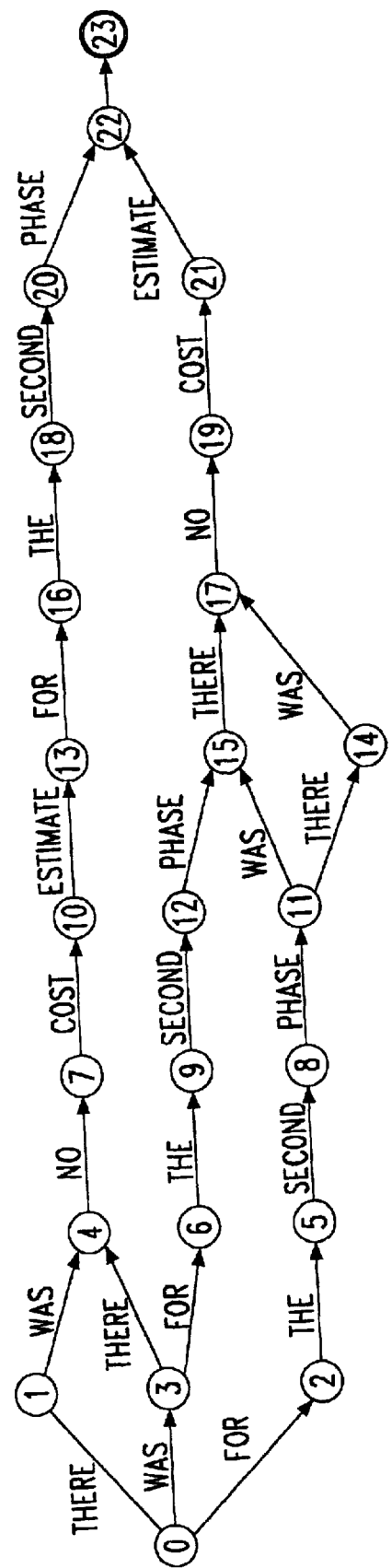
FIG. 4 illustrates a word lattice exemplary output from the unraveler module of the NLG system of the present invention.

Unraveler module 14 then uses the reference grammar, such as the XTAG grammar, stored in a database 20 and takes as its input the semi-specified derivation tree produced by tree chooser module 12, and with these inputs produces a word lattice, such as shown in FIG. 4. Each node in the derivation tree as shown in FIG. 2A consists of a lexical item and a supertag. The linear order of the daughters with respect to the head position of a supertag is specified in the reference grammar (e.g., XTAG grammar) within database 20. This information is consulted by unraveler module 14 to order the daughter nodes with respect to the head at each level of the derivation tree. In cases where a daughter node can be attached at more than one place in the head supertag (in this example, for was and for), a disjunction of all these positions is assigned to the daughter node. A bottom-up algorithm can then be used to construct a lattice, as shown in FIG. 4, that encodes the strings represented by each level of the derivation tree. The lattice at the root of the derivation tree is then the output from unraveler module 14.

Lattice 30 as shown in FIG. 4 encodes all possible word sequences permitted by the derivation structure. The word sequences are then ranked in the order of their likelihood by composing the lattice with a finite-state machine representing a trigram language model constructed from 1,000,000 words of Wall Street Journal corpus. The best path through the lattice is then selected using, for example, the Viterbi algorithm, and the top ranking word sequence is the output of LP chooser module 16.

The use of both a tree model and grammar in accordance with the present invention can experimentally be used to confirm the improvement of performance with the inventive technique. It is to be noted that while the example of the natural language grammar system of the present invention utilized XTAG as the reference grammar, various other grammars may also be used. For example, a much more limited grammar, for example, a grammar which specifies only the basic sentence word order, as for example, SVO, and subject-verb agreement, may also be used.

What is claimed is:

1. A natural language generator for translating an input dependency syntax tree into a natural language output, the generator comprising
- a tree choosing module, responsive to the input dependency syntax tree, for stochastically selecting tree-adjoining grammar trees for each node in the input dependency tree to create a semi-specified derivation tree, the tree choosing module including a tree model database for use in selection;
- an unraveling module, responsive to the stochastically selected tree-adjoining grammar trees created by the tree choosing module and including a predetermined reference grammar database for creating from syntactic realizations a lattice of all possible linearizations of said trees using the reference grammar of said database; and
- a linear precedence chooser module for selecting a most likely traversal path through the lattice as the natural language output of the generator.

2. The generator as defined in claim 1 wherein the linear precedence chooser module utilizes a Viterbi algorithm to select the most likely traversal path.

3. The generator as defined in claim 1 wherein the unraveling module includes a reference grammar database.

4. The generator as defined in claim 3 wherein the reference grammar database comprises an XTAG grammar database.

* * * * *